March 2, 1954    A. G. DOUVAS    2,671,170
SQUARE WAVE CIRCUIT
Filed Oct. 19, 1950

INVENTOR
A. G. DOUVAS
BY
M. R. McKenney
ATTORNEY

Patented Mar. 2, 1954

2,671,170

UNITED STATES PATENT OFFICE 2,671,170

SQUARE WAVE CIRCUIT

Augustus G. Douvas, Floral Park, N. Y., assignor to Bell Telephone Laboratories, Incorporated, New York, N. Y., a corporation of New York Application October 19, 1950, Serial No. 190,967

4 Claims. (Cl. 250—27)

This invention relates to pulse producing circuits and more particularly to circuits for translating sinusoidal and non-sinusoidal wave forms into square wave pulses.

One of the objects of this invention is to provide a circuit wherein sinusoidal and non-sinusoidal wave forms can be translated into substantially square wave pulses of controlled duration.

Another object is to provide a circuit for creating, producing, or generating square wave pulses which has a very high impedance as viewed from a set of output terminals.

A further object of this invention is to provide a circuit requiring a minimum number of circuit components to accomplish the objects herein set forth; more specifically to produce a series of pulses of voltage having a close approximation to rectangularity of wave form by employment of a single space discharge tube and a minimum of associated elements under control of an input voltage having a simple or complex sinusoidal wave form.

To accomplish these and other incidental objects a pulse generating circuit is employed in this invention utilizing a gaseous discharge tube having an electrostatic potential probe inserted therein. The probe electrode is connected to the cathode of said tube through an extremely high impedance path so that said probe will float potentialwise in the space path and acquire a potential slightly lower than that of the gaseous region immediately surrounding it. It is through the use of this high impedance path that said probe is distinguished from a so-called voltage tapping electrode. The probe does not function as a cathode or as an anode in the usual sense because current flow to or from it within the tube under all conditions of operation is negligible as compared to the current discharge between the cathode and the anode proper. With reference to the prior art, there is disclosed in C. J. Craft, 3rd, Patent 2,504,963, issued April 25, 1950, a pulse generating circuit utilizing a gas tube and potential probe to generate pulses of varying amplitude. However, in the present invention output pulses having a form substantially that of a square wave are developed across the load impedance connecting the probe to cathode when an alternating potential of sufficient magnitude to ionize the gas molecules in the discharge path is applied across the tube between anode and cathode.

Assuming that the potential applied across the gas tube is of sufficient magnitude to cause ionization of the gas molecules therein, then said tube will "break down" and conduct a current between the anode and cathode. During conduction the potential drop across the tube remains substantially constant, with the result that the potential of the probe likewise will remain substantially constant at a value somewhat lower than the corresponding anode potential, measured with respect to the cathode. Since the potential of the probe is the same as that of the cathode during non-conduction of the tube, and is at a constant higher value during conduction, pulses developed across the connecting impedance will have a square wave form.

Having set forth the objects of this invention a preferred form or embodiment of said invention is hereinafter described with reference to the accompanying drawings in which.

Figure 1:
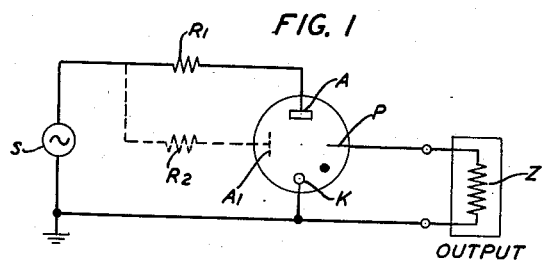
Fig. 1 is a schematic circuit diagram of the invention employing a cold cathode discharge tube.

Fig. 1 shows a voltage source S of varying amplitude which may be either of sinusoidal or non-sinusoidal wave form. Said source is applied to the anode A-cathode K space path of cold cathode tube T through current limiting resistor $R_1$. Electrostatic potential probe electrode P is physically positioned in the anode A-cathode K discharge region and is connected through high impedance output load Z to grounded cathode K.

Operation of the circuit can be explained as follows: Let it be assumed for purpose of illustration that source S generates a sinusoidal wave form. Curve $afbhc$ in Fig. 4 will then represent the potential of source S during the half cycle when anode A is positive with respect to ground, and curve $fgh$ will represent the potential of anode A during conduction of tube T. At the start of this half cycle the potential of anode A rises with respect to ground as represented by portion $af$ of said potential curve, all of which time tube T is non-conducting. Point $f$ represents the ionization potential of tube T, at which time tube T starts conducting current thereby causing the potential of anode A to drop to the sustaining value indicated by point $g$. As the potential of source S varies along curve $fbh$, the sustaining potential across the anode A-cathode K space path remains substantially constant as shown by curve $gh$. At point $h$ the potential across tube T falls to the extinction potential of said tube. Therefore, tube T deionizes and ceases to conduct current. For the remaining portion of said half cycle of applied voltage the potential of anode A with respect to ground is the same as the output potential of source S as shown by curve $hc$. During the second half cycle of applied voltage the potential of anode A with respect to grounded cathode K is negative; hence, there is no conduction through tube T during any portion of this half cycle with the result that curve $cde$ represents both the potential of anode A and the generated potential of source S.

Figure 4:
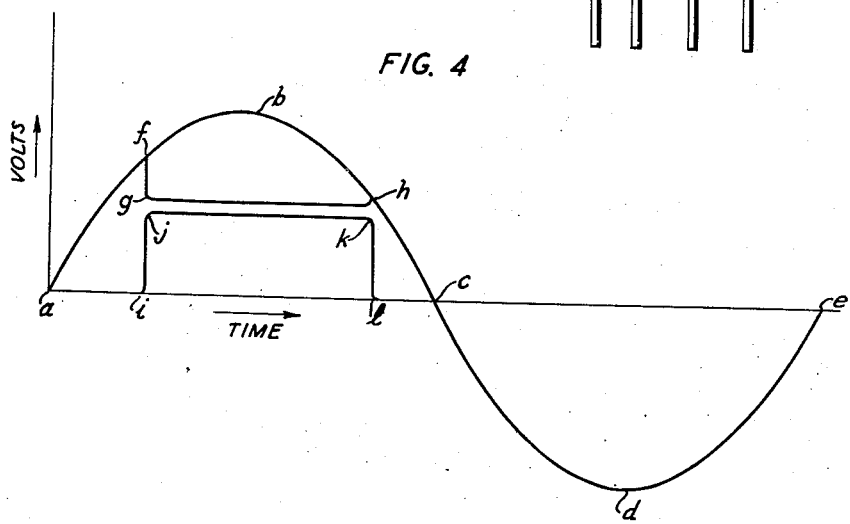
Fig. 4 is a set of curves indicating the operative potentials with respect to ground of various points of the circuit of Fig. 1.

The curve $ijkl$ in Fig. 4 represents the potential of probe P with respect to ground during conduction of tube T as previously described. Prior to the time tube T starts conducting current, indicated by the time interval $ai$, probe P remains at ground potential inasmuch as no current flows through load impedance Z to grounded cathode K. It is desirable in the operation of this circuit that load Z have extremely high impedance value, preferably several megohms, otherwise excessive current will flow through said load when tube T is conducting, thereby diminishing the amplitude of the pulses developed across the impedance connecting probe P to ground. At the breakdown point of tube T the potential of probe P increases from ground at $i$ to a maximum value at $j$. During conduction of tube T the potential of probe P remains constant at a value shown by curve $jk$ to be somewhat lower than the potential of anode A. Finally, at the extinction point, tube T ceases to conduct current and the potential of probe P immediately falls to ground at $l$. Since there is no conduction in tube T during the second half cycle of applied voltage from source S, the potential of probe P will remain at ground throughout said half cycle. A positive pulse of substantially square wave form will, therefore, be developed across load Z for every complete cycle of alternating voltage applied across tube T from source S. It should be noted that successful operation of the above-described circuit depends in no way upon the particular wave form of source S. Although a sinusoidal wave has been used for the purpose of illustration, substantially the same result can be obtained from any wave form of sufficient magnitude to ionize the gas molecules in tube T.

In order to minimize the rise time of potential on probe P from $i$ to $j$ and also to minimize the fall time from $k$ to $l$, the probe to ground capacitance should be kept at a minimum which necessitates the keeping of the capacitive component of output load Z at a minimum. If this condition is not fulfilled the output pulse will no longer retain a square shape, but will instead have sloping sides. Resistor $R_1$ prevents excessive current from flowing through tube T during conduction of said tube, thereby tending to maintain the discharge in the glow discharge region and also protecting tube T from damaging effects of excessive current.

In Fig. 1 there is indicated a starting anode $A_1$ connected to voltage source S through current limiting resistor $R_2$. Anode $A_1$, although not essential to the operation of the circuit as disclosed, may be added to tube T for the purpose of lowering the ionization potential of said tube to a point somewhat below $f$ in Fig. 4. The net result of a lower ionization potential would be an output pulse of somewhat longer time duration for a given positive input wave such as $abc$.

The gas tube employed in this invention is preferably of the cold cathode type since such tubes normally operate in the glow discharge region, thereby having a higher sustaining potential than corresponding hot cathode tubes which operate in the arc discharge region. Probe P, therefore, acquires a higher potential in the cold cathode type tube and the output pulses are of greater magnitude. As a suitable tube for use in this circuit was not commercially available, the one shown in Figs. 2 and 3 was designed to meet the requirements of the invention.

Figure 2:
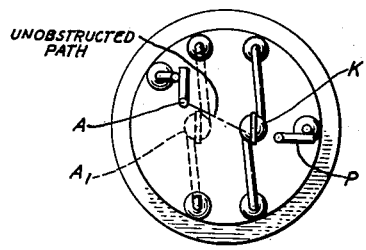
Fig. 2 is a plan view of the electrode structure of a tube suitable for the present purpose including among the elements thereof a potential probe for use in the circuit of Fig. 1.
Figure 3:
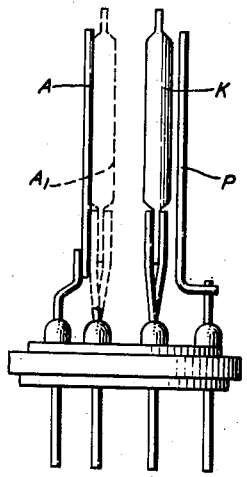
Fig. 3 is a front view of Fig. 2 with the glass envelope removed.

An old type tube base was used for supporting and making connections to the tube electrodes. All the electrodes were constructed of nickel, the starting anode $A_1$ and cathode K being coated with barium oxide. The starting anode is placed between the main anode and cathode, whereas the probe is behind the cathode. Such a positioning is desirable in order to keep the breakdown potential between main anode to probe and starter anode to probe of high value; however, this also introduces an undesirable effect of delaying the time build-up of potential on probe P. In practice a balance between these two conditions can be reached by adjusting the position of probe P with regard to the main discharge path in order to obtain the most satisfactory wave form for any given application of the invention herein disclosed. In order to force the discharge to the rear of the cathode with a minimum current, a cylindrical cathode instead of a plain one is preferred. The main anode is preferably located with respect to the cathode so that a line-of-sight or unobstructed path exists between said electrodes. This is illustrated in Fig. 2 where the outer surface of starter anode $A_1$, cathode K and probe P all lie in the same plane. The use of argon gas at a pressure of 15 millimeters of mercury in said tube was found to be satisfactory.

While the above-described arrangements are illustrative of an application of the principles of this invention, it should be obvious to persons skilled in the art that the numerous modifications may be made without departing from the scope of the invention.

What is claimed is:

1. A voltage pulse producing circuit comprising a gaseous discharge path between two electrodes, one of which is an anode and the other of which is a cathode, a potential probe inserted in said discharge path, a voltage source of varying amplitude applied across said discharge path, said voltage source varying from a value positive toward said anode insufficient to support ionization in said path to above a value of sufficient magnitude to ionize the gas molecules in said discharge path, other variations in said source, if any, being immaterial output terminals connected directly to said probe and to one of the electrodes of said discharge path, and an output impedance across said terminals, said impedance being predominantly resistive and of ohmic value great compared to the impedance between said electrodes in either the actively ionized or non-ionized condition of said discharge path.

2. A voltage pulse producing circuit for producing a voltage consisting of successive pulses of substantially flat topped characteristic with intervening periods of substantially zero voltage comprising a gaseous discharge path between two electrodes, a source of voltage varying from a value positive toward said anode sufficient to initiate and support ionization in said path to a negative value connected to said electrodes externally of said path by conductors, a potential probe inserted in said discharge path, output terminals connected directly to said probe and to one of the electrodes of said discharge path, and an output load of resistive nature and of ohmic value great compared to the impedance of said electrodes in either the actively ionized or the non-ionized condition connected across said terminals.

3. A circuit for translating a sinusoidal wave form into square wave pulses comprising a cold cathode gaseous discharge path having an anode, a cathode and an electrostatic potential probe therein, a current limiting resistance element to restrict the current flow through said discharge path, a voltage source of sinusoidal wave form applied across said discharge path between said anode and said cathode through said current limiting resistance element, said voltage source being of sufficient magnitude during some portion of the cycle to ionize said gaseous discharge path and of insufficient value during some portion of the cycle to maintain ionization in said path, and an output load consisting of an element of extremely high value of resistance compared to the impedance between said cathode and anode in the ionization condition of the path therebetween as to inhibit flow of ions to or from said probe to the negligible degree due to its capacity to store a charge across which the square wave pulses are generated, one terminal of said resistance load being connected directly to said electrostatic potential probe and the other terminal being connected directly to the cathode of said discharge path.

4. A device for producing from a voltage source of varying amplitude a voltage consisting of successive pulses of substantially flat topped characteristic with intervening periods of substantially zero voltage, said device consisting of a single closed vessel of the gaseous breakdown type filled with ionizable gas and having an anode electrode and a cold cathode electrode, said voltage source being connected directly across said anode and cathode in a path which in its part external to said tube is pervious to direct current, said voltage source being at times in a direction and rising to a value across said anode and cathode sufficient to ionize said gas to cause a space discharge of ions between said electrodes and falling at times below the value necessary to sustain said ionization, an electrostatic potential probe located in said vessel in the region through which said space discharge exists, a conductive path from said probe extending externally of said vessel to said cathode including a resistive impedance of such high value as to inhibit significant current flow to or from said probe other than that due to the capacity, said impedance comprising an output impedance across which the voltage of flat topped characteristic appears and from which it may be derived for use.

AUGUSTUS G. DOUVAS.

References Cited in the file of this patent

UNITED STATES PATENTS

| Number | Name | Date |
|---|---|---|
| 1,973,082 | Koros | Sept. 11, 1934 |
| 2,092,861 | Swart | Sept. 14, 1937 |
| 2,108,219 | Swart | Feb. 15, 1938 |
| 2,240,788 | Kock | May 6, 1941 |
| 2,252,189 | Langer | Aug. 12, 1941 |
| 2,416,307 | Grieg | Feb. 25, 1947 |